Patented Oct. 17, 1939

2,176,491

UNITED STATES PATENT OFFICE 2,176,491

DENATURED ALCOHOL CONTAINING FORMAMIDE

Louis J. Figg, Jr., Kingsport, Tenn., assignor to Eastman Kodak Company, Rochester, N. Y., a corporation of New Jersey No Drawing. Application October 14, 1937, Serial No. 168,969

1 Claim. (Cl. 202—77)

This invention relates to the denaturing of ethyl alcohol, and to alcohol so denatured.

It is an object of my invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

I have discovered that a lower aliphatic amide selected from the group consisting of formamide and acetamide is an effective denaturant for alcohol. In denaturing ethyl alcohol with my novel denaturants, I may use from 0.5 to 5 parts of formamide or acetamide, or even more, per 100 parts of 95% alcohol. These amides may be used with any other denaturants with which they may be found to be compatible.

What I claim as my invention and desire to be secured by Letters Patent of the United States is:

Industrial ethyl alcohol denatured with 0.5 to 5 parts of formamide, as an essential denaturing element, per 100 parts of 95% ethyl alcohol.

LOUIS J. FIGG, JR.